United States Patent
Schmidt et al.

(10) Patent No.: US 6,833,909 B2
(45) Date of Patent: Dec. 21, 2004

(54) DEVICE FOR OPTICAL DISTANCE MEASUREMENT OF DISTANCE OVER A LARGE MEASURING RANGE

(75) Inventors: Dierk Schmidt, Sindelfingen (DE); Joerg Stierle, Waldenbuch (DE); Peter Wolf, Leifelden-Echterdingen (DE); Gunter Flinspach, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/343,802

(22) PCT Filed: Apr. 27, 2002

(86) PCT No.: PCT/DE02/01553
§ 371 (c)(1),
(2), (4) Date: Feb. 4, 2003

(87) PCT Pub. No.: WO01/36923
PCT Pub. Date: May 25, 2001

(65) Prior Publication Data
US 2003/0128351 A1 Jul. 10, 2003

(30) Foreign Application Priority Data
Jun. 26, 2001 (DE) .................................. 101 30 763

(51) Int. Cl.[7] ........................... G01C 3/08; G02B 27/40
(52) U.S. Cl. ................................... 356/4.01; 250/201.6
(58) Field of Search ............................... 356/3.01–3.16; 250/201.6; 396/106, 120, 124

(56) References Cited

U.S. PATENT DOCUMENTS

| 4,105,332 A | | 8/1978 | Hohne et al. |
| 5,354,983 A | * | 10/1994 | Juds et al. |
| 5,530,548 A | * | 6/1996 | Campbell et al. ........... 356/623 |
| 6,226,076 B1 | | 5/2001 | Yoshida |

FOREIGN PATENT DOCUMENTS

| DE | 43 16 348 A1 | 11/1994 |
| WO | 01 36923 A | 5/2001 |

* cited by examiner

Primary Examiner—Bernarr E. Gregory
Assistant Examiner—Brian Andrea
(74) Attorney, Agent, or Firm—Michael J. Striker

(57) ABSTRACT

The invention relates to a device for optical distance measurement, having a emitter unit (12) having a light source (17, 18) emitting modulated optical beam (13, 20, 22) to a target object (15), and having a receiver unit (14), spaced apart from the optical axis (38) of the emitter unit (12) with at least one optical detector (54) for receiving the optical beam (16, 49, 50) returning from the target object (15), and having a control and evaluation unit (36) for ascertaining the distance (48) of the device from the target object (15).

It is proposed that the active, light-sensitive face (66, 67, 68, 69) of the detector (54) of the receiver unit (14) narrows in the direction (61) of a beam displacement for decreasing target object distances (48) that is due to the parallax of the returning beam (16).

7 Claims, 3 Drawing Sheets

DEVICE FOR OPTICAL DISTANCE MEASUREMENT OF DISTANCE OVER A LARGE MEASURING RANGE

BACKGROUND OF THE INVENTION

The invention is based on a device for optical distance measurement as generically defined by the preamble to the independent claim.

Optical distance measuring devices per se have long been known and by now are also sold commercially. These devices emit a modulated beam of light, which is aimed at the surface of a desired target object whose distance from the device is to be ascertained. The light reflected or scattered by the target area aimed at is partly detected again by the device and used to ascertain the distance sought.

The range of use of such distance measuring devices generally encompasses distances in the range from a few centimeters to several hundred meters.

Depending on the distances and the reflectivity of the target object, different demands are made of the light source, the quality of the measuring beam, and the detector.

The optical distance measuring devices known from the prior art can be divided in principle into two categories, depending on the disposition of the transmission and reception channels necessarily present in the device. First, there are devices in which the emission channel is disposed at a certain spacing from the reception channel, so that the respective optical axes extend parallel to one another. Second, there are monoaxial measuring devices, in which the reception channel extends coaxially to the emission channel.

The biaxial measuring systems have the advantage of not requiring complicated beam splitting for selecting the returning measurement signal, so that optical crosstalk from the emission channel directly into the reception channel can for instance better suppressed.

On the other hand, in biaxial distance measuring devices there is the disadvantage among others that for the range of relatively short measurement distances, parallax can cause detection problems:

The projection of the target object onto the detector surface of the measurement receiver integrated with the device, which projection, for long target distances, is still unequivocally located on the detector wanders increasingly away from the optical axis of the receiving branch as the measuring distance becomes shorter and furthermore undergoes a variation in the beam cross section in the plane of the detector.

This means that unless further provisions are made in the device for the near range of detection, that is, for a short distance between the target object and the measuring device, the measurement signal can tend toward zero.

From German Patent Disclosure DE 43 16 348 A1, a device for distance measurement is known with a visible measuring beam generated by a semiconductor laser; its receiver contains an optical waveguide with an optoelectronic converter downstream of it. The light entry face into the fiber of the waveguide is disposed in the projection plane of the receiving lens element of this device for great object distances and from this position can be shifted transversely to the optical axis.

In this way, in the device of DE 43 16 348 A1, the measuring beams, which for short object distances strike the receiving lens element more and more obliquely, can be directed, via the tracking of the optical fibers, onto the light-sensitive surface of the detector, for a detector that is not three-dimensionally variable.

The requisite electronic triggering of the tracking and the use of additional and in particular also moving parts in the distance measuring device disclosed in DE 43 16 348 A1 mean a not inconsiderable expenditure, which increases the complexity and thus the costs and vulnerability of such a system.

Alternatively, DE 43 16 348 A1, for solving the parallax problem in biaxial measuring devices, proposes that the optical waveguide entry face be stationary, and by optical deflection means in the peripheral region of the receiving lens element to assure that the measuring light beams can still strike the detector even as the distance from the object is decreasing. Among other things, it is proposed that a deflection mirror be used for this purpose, which deflects the measuring beams, entering the measuring device from a short object distance, onto the detector. For solving the same object, the same reference also proposes the use of a prism, which is placed in the peripheral region of the receiving lens.

The necessary additional components must be considered a disadvantage in solving the problem in the above way. Moreover, a negative interaction of these additional components with the beam path of the measuring beams from a great distance cannot always be precluded, so that for this reason as well, signal impairments can occur that restrict the usable measurement range of the distance measuring device.

SUMMARY OF THE INVENTION

The device for optical distance measurement of the invention having the characteristics of the independent claim has the advantage over the prior art of being able to dispense with additional optical elements for correcting the parallax problem, and nevertheless of making a measurement signal on the detector possible that is also sufficient for the near range.

The shape of the light-sensitive, active face of the detector of the invention is selected such that even in the near range, a signal of adequate amplitude is available at the detector surface.

This makes it easily and reliably possible to expand the measurement range accessible to this measuring device.

Compared to the devices for optical distance measurement known from the prior art, the device of the invention has the advantage that the distance covered by the optical beam is not affected by the means for overcoming the parallax problem, so that these means have no negative effects on the distance measurement.

Moreover, no calibration of additional and in particular moving components in the measuring device is needed.

Advantageous versions of the device of the invention will become apparent from the characteristics recited in the dependent claims.

Advantageously, the size of the light-sensitive face of the detector of the receiver unit is selected to be so great that a still-adequate signal strikes the detector even in the near range. Because the measuring beam returning from the target object, for a decreasing object distance, migrates laterally in the common plane of the optical axis of the emitter unit and the optical axis of the receiver unit, the detector will advantageously assume a form that is elongated in that direction. In this way, the dependency of the direction of the returning measurement signal on the distance of the measuring device from the target object is taken into account by the concrete shape, according to the invention, of the effective, active detector face.

The shape according to the invention of the effective detector face furthermore makes it possible to take into account the dependency of the intensity of the returning measurement signal on the distance of the measuring device from the target object. Because the square law is fundamental to the change in intensity as a function of the distance traveled, the returning measurement signal for the near range is markedly larger than for target objects that are located far away from the measuring device.

The length of the effective detector face perpendicular to the common plane of the optical axes of the emitter unit and receiver unit can therefore decrease to the extent that the light signal, because of the shorter distance, increases in the near range. This has the advantage that because of the length of the detector, enough light from the near range will still strike the detector, yet because its active, light-sensitive face is becoming smaller in this direction, the detector cannot be oversteered by the light from the near range. A displacement of the detector out of the focus of the receiving lens along the optical receiving axis for adapting the signal intensity striking the detector is thus no longer necessary in the device of the invention.

The embodiment of the detector face according to the invention thus also has the advantage that the ratio of useful light to extraneous light is improved markedly, so that for this reason as well, the measurement accuracy of the device in the immediate near range is enhanced, and thus the measurement range of the device is expanded.

In terms of the size of the face of the detector, it must merely be assured that the effective area in the region of the detector in which light from far-away target objects strikes the detector surface be large enough to detect as much as possible the entire signal. This is another consequence of the square law, to which the detected intensity is subject, and leads to a relatively weak detection signal for far-away measurement objects.

The lateral length of the detector must accordingly be so great that enough light from the immediate near range of detection will still reach the detector face. Because of the high signal level, which is due to the short distance in the near range, it is unnecessary in this case to detect the full signal intensity.

Another advantage of the device claimed is that the electrical-capacitive properties of the detector of the measuring device are affected favorably by the shape, according to the invention, of one exemplary embodiment of the active detector face. An overly large detector surface would increase the electrical capacitance of the detector, so that the response characteristic over time, or—equivalent to it—the frequency response of the measurement system would no longer meet the necessary requirements in terms of chronological and frequency resolution of the measurement system.

In an advantageous version of the device of the invention, the face of the detector used is therefore precisely as large as the peripheral conditions sketched above require.

A simple and inexpensive embodiment of the device of the invention with the detector face claimed is obtained if the effective, that is, light-sensitive detector face is embodied by means of partially covering an originally larger detector face. To that end, for instance, a large area detector can include a layer opaque to light in those regions that are not meant to be used for detection, so that it is possible for only the claimed shape to be used as the effective, active detector face. Depending on the wavelength of the measurement signal used and on a correspondingly selected detector, the opaque regions can be created for instance applying a layer to the detector surface by vapor deposition or painting. The claimed shape for the active face of the detector could also be achieved with a simple mechanical mask or shade.

Advantageously, the device of the invention for optical distance measurement can be realized by using a laser as the light source. Lasers and in particular laser diodes are available over the entire visible spectral range of electromagnetic waves. Laser diodes, because of their compact size and by now also their high output capacities, are especially suitable for use in distance measuring devices of the claimed shape.

The optically opaque layer partly applied to the detector face can in this case for instance be a vapor-deposited metal layer, which at the desired points optically deactivates the semiconductor detector used.

BRIEF DESCRIPTION OF THE DRAWINGS

Further advantages will become apparent from the ensuing description. In the drawing, exemplary embodiments of the device of the invention are shown. The description, drawings and claims include numerous characteristics in combination. One skilled in the art will consider these characteristics individually as well and put them together to make useful further combinations.

Shown are.

DETAILED DESCRIPTION OF THE PREFERRED EMBODIMENTS

Figure 1:
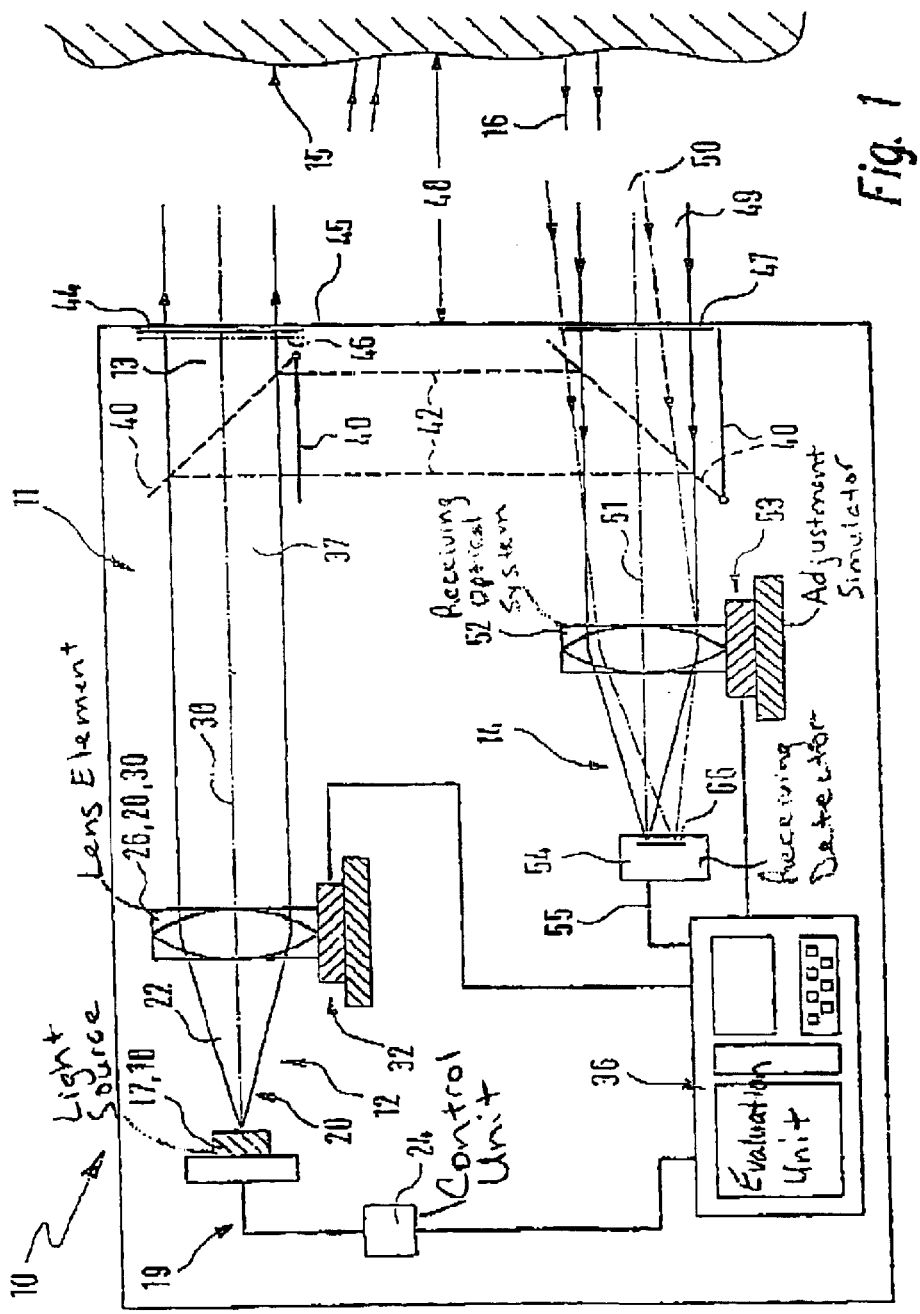
FIG. 1, the schematic plan view on one exemplary embodiment of the measuring device of the invention.

In FIG. 1, a distance measuring device of the invention is shown schematically along with its most important components, in order to describe its function.

The device 10 of the invention has a housing 11, in which a emitter device 12 for generating a measurement signal 13 and a receiver device 14 for detecting the measurement signal 16 returning from a target object 15 are accommodated.

The emitter device 12 contains a light source 17, which in the exemplary embodiment of FIG. 1 is embodied by a semiconductor laser diode 18. It is equally possible to use other light sources in the device of the invention. The laser diode 18 emits a laser beam 20, in the form of a light beam 22 that is visible to the human eye.

The laser diode 18 is driven via a control unit 24, which by means of suitable electronics creates a modulation of the electrical input signal 19 of the diode 18. By means of such modulation of the diode current, it can be achieved that the optical measurement signal 13 for distance determination is likewise modulated in the desired way.

The laser beam 20 then passes through a collimating optical element, in the form of a lens element 28, which in FIG. 1 is shown in the form of a single lens 30. The lens element 28, in this exemplary embodiment, is optionally located on an adjustment simulator 32, which in principle makes it possible to vary the position of the lens element in all three directions in space, for instance for the sake of calibration.

After passage through the lens element 28, the result is for instance an amplitude-modulated measurement signal 13, in the form of a parallel light beam 37, which propagates along the optical axis 38 of the emitter unit 12, as schematically shown in FIG. 1.

In the emission branch 12 of the device of the invention, there is also a preferably switchable beam deflector 40, which makes it possible to deflect the measurement signal 13 directly onto the receiver unit 14 of the device 10, circumventing a target object. In this way, it is possible to generate a reference distance 42, internal to the device, which permits calibration of the measuring system.

If a measurement is to be performed, the measuring beam 13 leaves the housing 11 of the device of the invention through an optical window 44 in the end wall 45 of the device 10. The opening of the optical window can be assured by a shutter 46.

For measurement, the measuring device 10 is aimed at a target object 15, whose distance 48 from the measuring device is to be ascertained. The signal 16 either reflected from or scattered by the desired target object 15 forms a returning measuring beam 49, 50, which to a certain extent returns into the measuring device 10 again.

Through an entry window 47 in the face end 45 of the device 10, the returning measuring radiation 16 is input into the measuring device and, in the exemplary embodiment of FIG. 1, deflected onto a receiving optical system 52.

In FIG. 1, as examples, two returning measuring beams 49 and 50 for two different target object distances 48 are shown. For great object distances, and in this case "great" means compared to the focal length of the receiving optical system, the signal 16 returning from the target object strikes parallel to the optical axis 51 of the receiver device 14. This case is represented in the exemplary embodiment of FIG. 1 by the measuring beam 49. As the object distance decreases, the returning signal 16 striking the measuring device is increasingly inclined relative to the optical axis 51 of the receiver unit 14, because of parallax. In FIG. 1, the beam 50 is drawn in as an example of a returning measuring beam from the near range of the distance measuring device.

The receiving optical system 52, which in the exemplary embodiment of FIG. 1 is likewise symbolized by a single lens, collimates the returning measurement signal 16 and focuses its beams 49, 50 onto a receiving detector 54, which may be embodied as a PIN diode or CCD chip, or as some other face detector familiar to one skilled in the art. The face detector is as a rule aimed with its active, life-sensitive surface perpendicular to the optical axis of the receiving branch. The incident optical signal is converted by the receiving detector 54 into an electrical signal 55 and delivered to the evaluation unit 36 for further evaluation.

The receiving optical system 52, which in the exemplary embodiment of FIG. 1 is mounted on an adjustment simulator 53, is located approximately at the distance of its focal length from the active face of the detector, so that incident radiation arriving a target object that is located far away from the measuring device is focused precisely onto the detector. For short distances from the target object, however, it must be observed that the projection position for the measurement spot reflected or scattered by the target object moves increasingly away from the focus of the receiving lens. Thus as the distance of the target object from the measuring device decreases, the focused returning measuring beam wanders farther and farther away from the optical axis of the receiver device and thus also deviates increasingly from the optical axis of the emitter device. Furthermore, because of the altered projection conditions at the receiving lens element, the returning measuring beam is no longer focused precisely onto the detector face. As the target object distance becomes shorter, the result is an ever-larger measurement spot on the detector surface.

Other components present in the measuring device that however are not absolutely necessary for comprehension of the device of the invention will not be addressed in further detail in this connection. It will merely be noted that the measuring device naturally also has a control and evaluation unit 36.

Figure 2:
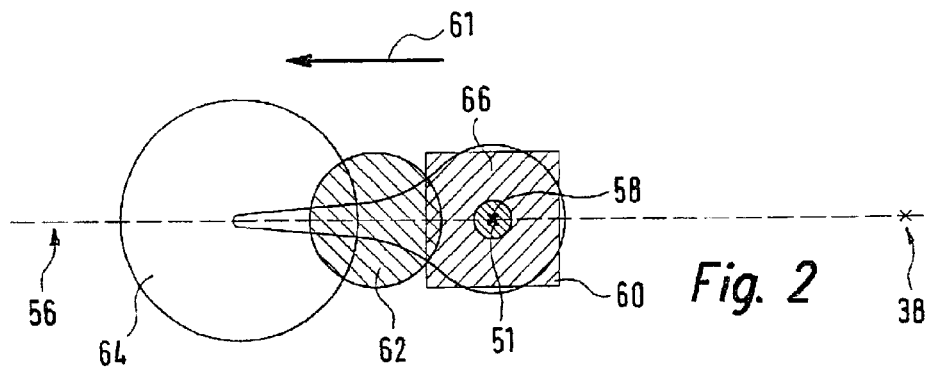
FIG. 2, a plan view on the detector surface of the invention, with measuring beams drawn in at different distances between the measuring device and the measurement object.

The relationships between the distance of the target object from the measuring device and the position and size of the measurement spot on the detector surface are shown again schematically in FIG. 2 to provide an overview.

FIG. 2 shows a plan view on the detector surface, viewing in the direction of the measurement signal 16 returning from the object being measured. Reference numeral 56 designates the common plane of the optical axis 38 of the emitter unit 12 and the optical axis 51 of the receiver unit 14. The measurement spot 58 of the returning beam 16, for very great object distances 48, is located on the optical axis of the receiver unit 14 and is focused into a small focal spot on the surface 66 of the detector 54. Since the detector 54 is located at approximately the spacing of the focal length of the receiving optical system 52, light, which in optical terms comes from infinity, is focused directly onto the detector surface, in obedience to the laws of optical projection.

With decreasing distance 48 of the measuring device 10 from the target object 15, the returning signal 16 strikes the receiving lens element 52 more and more obliquely, so that the measurement spot on the detector surface also wanders in the direction of the arrow 61 in FIG. 2.

The measurement spot 62 also shown in FIG. 2 for a small object distance 48 of the target object 15 from the measuring device 10 has thus wandered away from the optical axis 51 of the receiver device and has increased markedly in its length. For a very short measuring distance 48 of the measurement object 15 from the measuring device 10, a measurement spot 64 of the returning measurement signal 16 on the detector surface that is still further markedly enlarged is the result, and it also comes to be located on the detector face farther away from the optical axis 51 of the receiver unit 14.

This displacement of the measurement spot with the relative distance 48 of the measurement object 15 from the measuring device 10 can have the effect that for very short object distances, the returning signal 16 no longer strikes the active face of the measurement receiver 54, and this is indicated by an area 60 shown in FIG. 2 in dashed lines, which is meant to symbolize the surface of a conventional measuring receiver of the prior art.

To take the variation in size and position of the measurement spot in the plane of detection of the receiver unit 14 into account, the active, light-sensitive surface 66 of the detector 54 of the invention is designed accordingly. In the region of the optical axis 51 of the receiver unit 14, the detector face 66 should be at least so large that the entire measurement spot 58 from the far range, that is, for very great target object distances 48, entirely strikes the active detector face 66.

The active face 66 of the detector 54, in the exemplary embodiment of FIG. 2, narrows increasingly in the direction 61 of the beam displacement caused by parallax of the returning beam 16, for decreasing target object distances 48. In its lateral extent, the detector face 66 is so large that even for very short distances 48 of the target object 15 from the measuring device 10, a sufficient measurement signal strikes the detector 54. Because of the high signal level of the returning measurement signal from the near range, the entire measurement spot need not come to be located on the active detector face.

Figure 3:
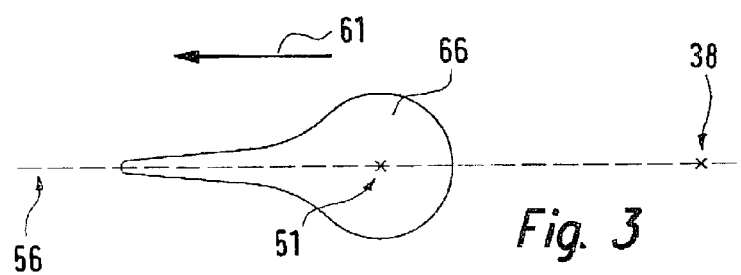
FIG. 3, the detector surface of the invention from FIG. 2, shown by itself.

FIG. 3 again shows the detector face 66 of the invention of FIG. 2 individually again, for the sake of an overview.

Figure 4:
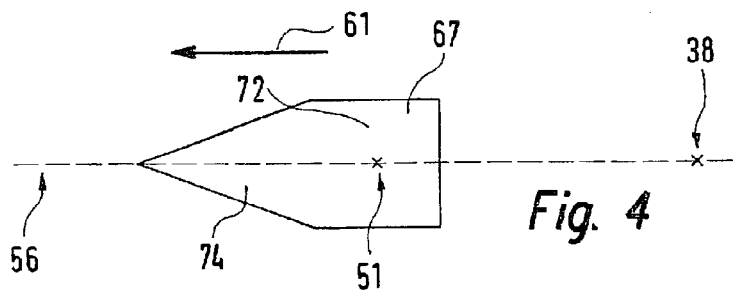
FIG. 4, an alternative exemplary embodiment of the active detector face of the invention.
Figure 5:
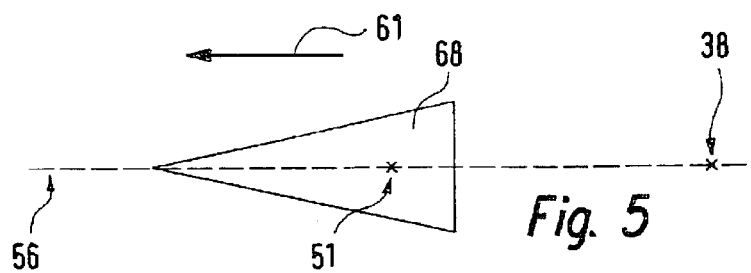
FIG. 5, a further exemplary embodiment of the active detector face of the invention.

In FIGS. 4 and 5, further exemplary embodiments of an active, light-sensitive surface of the detector 54 of the invention are shown; they are meant to further illustrate the fundamental concept of the invention but should not be considered as a limitation of the claimed device. In FIGS. 4 and 5, reference numeral 56 in each case represents the common plane of the optical axis 38 of the emitter unit 12 and the optical axis 51 of the receiver unit 14. The point 38 marks the location of the optical axis of the emitter unit 12, and the point 51 marks the corresponding location of the optical axis of the pat 14.

The exemplary embodiment of FIG. 4 has a surface 67 of a detector 54 of the invention, and this surface has a first region 72, in which the size of the light-sensitive face in the direction 61 of the beam displacement caused by the parallax of the returning measurement signal 16 is constant, and a second region 74 of the surface 67, directly adjoining the first, where the size of the detector face 67 decreases continuously in the direction 61 of this beam displacement.

FIG. 5 discloses the light-sensitive surface 68 of a detector 54, which decreases continuously and uniformly in the direction 61 of the beam displacement caused by parallax, and thus assumes the shape of a triangle. It is understood that the detector 54 of the invention may instead have a trapezoidal shape, which becomes narrower with increasing distance from the optical axis of the emitter unit; for instance, in the exemplary embodiment of FIG. 4, the narrowing of the detector face can also be created by means of a discrete step.

Figure 6:
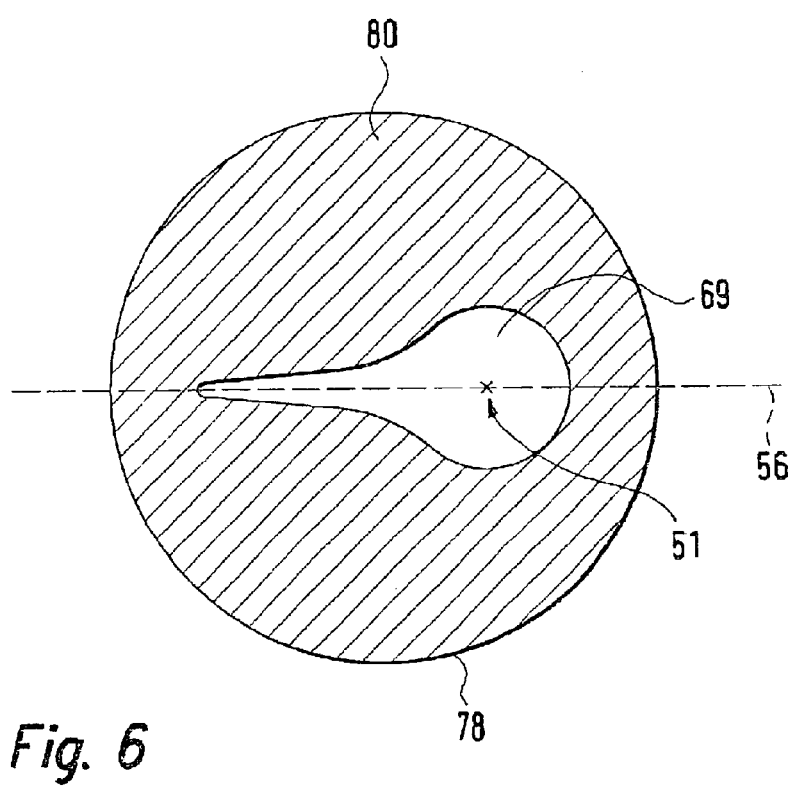
FIG. 6, the plan view on one exemplary embodiment of a detector face of the invention.

FIG. 6 shows one possible way of realizing an exemplary embodiment of the detector 54 of the invention. While in the exemplary embodiments of FIGS. 2–5 the effective, i.e., light-sensitive, surface 66, 67, 68 of the detector 54 is equal in area to the total area of the detector face, in the exemplary embodiment of FIG. 6 the active, i.e., effective, light-sensitive detector face 69 is derived from an originally larger detector face 78. To that end, the optically sensitive face 78 of a semiconductor detector, for instance with a circular detector face, is coated in certain regions with an optically opaque layer 80, thus deactivating the semiconductor in these coated regions, so that now only a noncoated partial face 69 of the semiconductor detector remains light-sensitive. This active partial face 69 can be given any desired shape in the production process, including the shapes of the detector faces 66, 67 and 68 shown in FIGS. 2–5. For creating this opaque layer, vapor deposition of a metal layer onto the desired points of the original detector face can for instance be employed. Still other provisions for optically deactivating the semiconductor surface that are familiar to one skilled in the art can be used for this purpose, and so the details of the production need not be addressed here.

It is a feature common to all the structural forms of the exemplary embodiments shown that for decreasing target object distances, the active or in other words light-sensitive face of the detector of the invention narrows in the direction of the beam displacement caused by parallax. That is, the length of the active face of the detector perpendicular to the common plane of the optical axes of the emitter unit and receiver unit decreases in the aforementioned direction.

The device of the invention is not limited to the exemplary embodiments presented in this description.

It will be noted explicitly that a convex detector face is also conceivable. The precise form of the variation in the detector face with increasing distance from the optical axis of the emitter device depends, among other factors, on the desired measurement range in which the measuring device of the invention is intended to operate. Also the precise geometry of the device and the optical projection conditions in the receiving branch should be taken into account for the sake of optimization. The narrowing of the active detector face need not be continuous, either; instead, it can be realized in discrete form, for instance in individual steps.

What is claimed is:

1. A device for optical distance measurement, comprising an emitter unit (12) having a light source (17, 18) emitting a modulated optical beam (13, 20, 22) to a target object (15) a receiver unit (14) spaced apart from the optical axis (38) of the emitter unit (12) with at least one optical detector (54) for receiving the optical beam (16, 49, 50) returning from the target object (15); and a control and evaluation unit (36) for ascertaining the distance (48) of the device from the target object (15), wherein an active, light-sensitive face (66, 67, 68, 69) of the detector (54) of the receiver unit (14) narrows in the direction (61) of a beam displacement for decreasing target object distances (48) that is due to the parallax of the returning beam (16).

2. The device of claim 1, wherein the light-sensitive face (66, 67, 68, 69) of the detector (54) is at least large enough that a measurement spot (58) of the returning bean (16, 49) from a target object (15) a great distance away is detected completely.

3. The device of claim 1, wherein the length of the light-sensitive face (66, 67, 68, 69) of the detector (54) in the direction perpendicular to the optical axis (51) of the receiver unit (14) is at least so great that the measurement beam (50) returning from a target object (15) in a near range at least partly also strikes the light-sensitive face (68, 67, 68, 69).

4. The device of claim 1, wherein the light-sensitive face (66, 67, 68, 69) of the detector (55) has an axis of symmetry that is located in a common plane (56) of the optical axes of the emitter unit (38) and receiver unit (51).

5. The device of claim 1, wherein the active, light-sensitive face (66, 67, 68, 69) of the detector (54) is formed out of a larger, optically sensitive detector face (78) by partial coverage of the latter.

6. The device of claim 4, wherein the active, light-sensitive face (66, 67, 68, 69) of the detector (54) is formed by partial application of an optically opaque layer (80) to the originally larger, optically sensitive detector face (78).

7. The device of claim 1, wherein the light source (17, 18) is a laser, and in particular a laser diode (18), which emits radiation in the visible wavelength range, in terms of the human eye, of the spectrum of electromagnetic waves.

* * * * *